Dec. 30, 1958
S. NATELSON
2,866,938
VACUUM TUBE VOLTMETER
Filed March 9, 1955
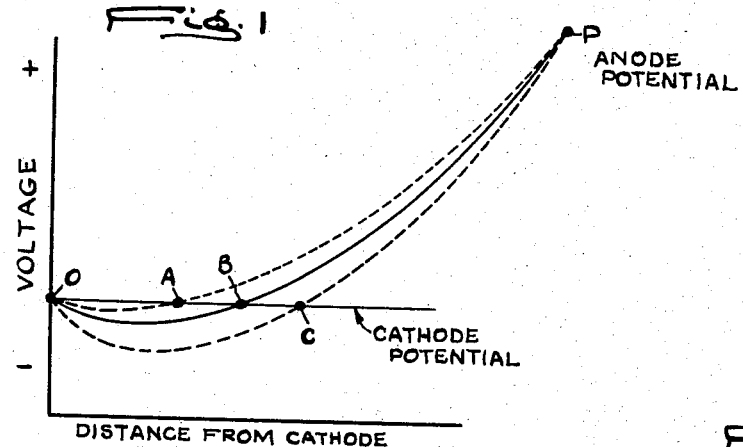
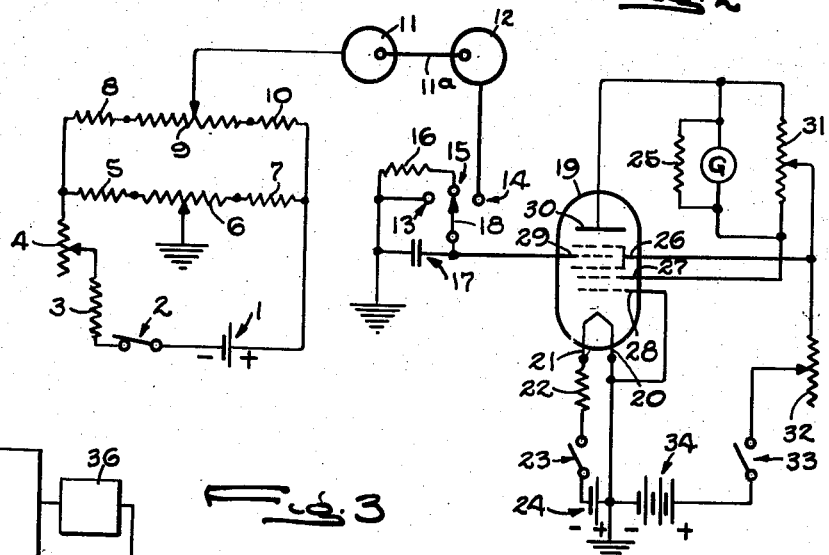
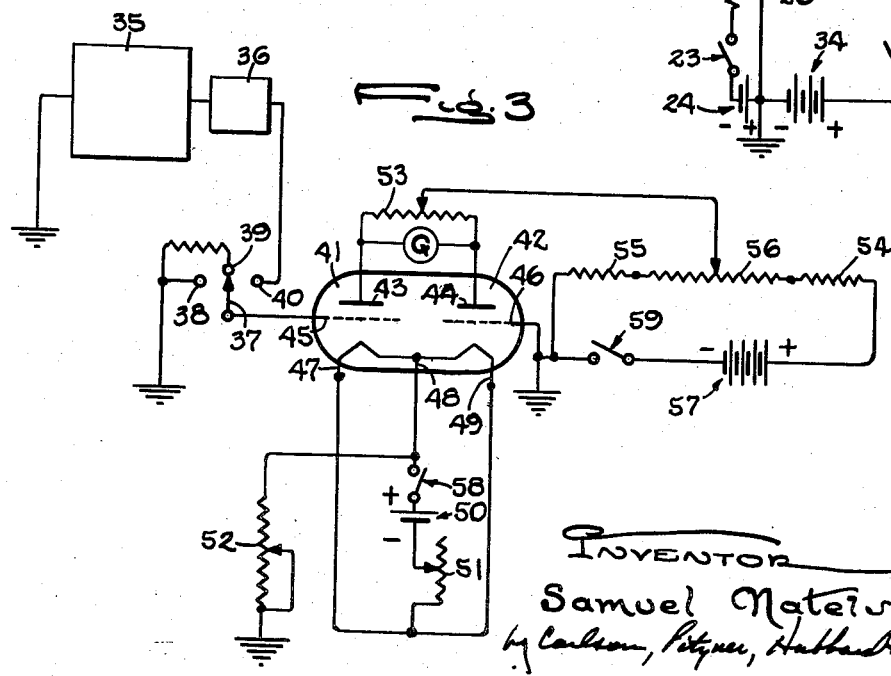
INVENTOR
Samuel Natelson
by Carlson, Pitzner, Hubbard & Wolfe
ATTORNEY

United States Patent Office 2,866,938
Patented Dec. 30, 1958

2,866,938
VACUUM TUBE VOLTMETER
Samuel Natelson, Rockford, Ill.

Application March 9, 1955, Serial No. 493,116

8 Claims. (Cl. 324—123)

This invention relates to an instrument for measuring small voltages with greater accuracy through higher resistances than has been possible heretofore.

If a voltage source is connected to an ammeter a current will flow. The amount of current flowing will depend not only on the voltage of the source but also on its internal resistance and the resistance of the meter. In order to overcome this difficulty a second voltage is applied in a direction opposite to the source tested, and the point of balance is determined by an instrument used to determine the null point. In measuring small voltages this method suffers from the fact that while attaining the null point some current must flow. Since electrodes such as the glass electrode and most electrodes in general tend to become polarized even with small current flow, serious error is introduced. For this reason it is customary to resort to the electronic tube.

With the electronic tube, leads from the voltage source to be measured, are attached to the grid and cathode of the tube and change in current flowing through the plate is measured. Since current flows from the grid to the cathode, within the tube, the internal resistance of the voltage source again becomes a factor. This current is called the grid current. The grid current value, multiplied by the resistance of the source gives the voltage drop across the source due to its internal resistance. For example, if a resistance of one megohm is attached from the grid to the cathode and a current of one microampere flows, then the grid voltage will be changed by one volt. Since different voltage sources may have different resistances, it is apparent that such an instrument would be in serious error when measuring voltages of the order of microvolts, when the internal resistance of the source is high.

To overcome this difficulty, special tubes have been designed where the grid is removed to greater distances from the plates. These are called low grid current tubes. When this is done the effect of grid current is lowered but not eliminated completely. Thus resistances greater than 100 megohms still introduce serious error. Further, these low grid current tubes, because of the position of the grid, have now lost their power of amplification, and now require one or more additional amplifying tubes. This introduces instability in the instrument and drift, typical of amplifying circuits. Special circuits, such as feed back circuits and cathode followers, have been designed but the problem of grid current remained unsolved.

In some instruments, one lead from the voltage source is connected to the grid of an electronic tube and the other lead is connected to one lead of a variable voltage source (potentiometer) which in turn has its other lead connected to the cathode of the tube to complete the circuit. In this case, the variable voltage is changed until it equals the unknown voltage being measured, as indicated by return of the galvanometer in the plate circuit of the electronic tube to its initial position. In this system, if the voltage being measured has high internal resistance, part of the reading of the potentiometer represents the unknown voltage, and part of this reading represents the voltage placed on the grid due to the internal resistance of the source. Since the movement of the potentiometer arm changes the internal resistance of the potentiometer, which is now in the circuit, further error is introduced. For this reason, potentiometer circuits of low internal resistance are used. This increases the current drain on the cell in the potentiometer circuit and standard cells cannot be used in these circuits. The standard cell is then put in an auxiliary circuit to which the cell in the potentiometer is compared from time to time.

Another problem which presents itself in measuring voltages with the electronic tube is due to the free or floating grid potential. If the grid is insulated from the ground, that is left unconnected, it acquires a potential due to its position in the tube between the positive plate and the cathode which is grounded. This potential will vary from tube to tube even of the same type, since it is almost impossible to place the grid at exactly the same position of all tubes. Further, this potential varies with the voltage on the plate of the tube and the current flowing through the filament of the tube. Thus the floating grid potential is a variable quantity.

In some potentiometers, using electronic tubes, a voltage is supplied to buck out the floating grid potential. In others it is ignored and assumed to be constant. Since voltages are measured with the grid potential as a baseline, a serious source of error, when small voltages are being measured, is the constant drifting of this baseline.

In some vacuum tube voltmeters, a second tube arranged in a Wheatstone bridge arrangement, with the tube used for measuring the voltage, serves to compensate for variations in voltages in the first tube. The problem of grid current and changing grid potential are not solved in this circuit.

The circuit described herein, eliminates the problem of grid current so that the internal resistance of the voltage source is not concerned in the voltage measured. Further, the problem of a changing grid potential or baseline for measuring the unknown voltage is eliminated. In the circuit described herein the grid is at ground potential at all times. With the baseline of measurement being the ground, instead of a variable voltage, accuracy can be achieved in measuring small voltages, which was not possible heretofore with the vacuum tube voltmeter.

The circuit described herein is extremely stable and constant in performance. Voltages of the order of microvolts can be measured readily with a high degree of accuracy and precision through resistances of the order of 1000 megohms.

The object of this invention is to maintain the grid and the cathode at the same potential, so that no current may flow between them, thus producing zero grid current. In the absence of grid current, external resistances connected from the grid to the cathode will have no effect on the grid voltage, since no current is flowing. This is done without applying a potential to the grid, from an outside source. This is distinct from those circuits which buck out the grid voltage by a voltage applied directly to the grid.

Other objects and advantages of the invention will become apparent from the following detailed description taken in connection with the accompanying drawings, in which Figure 1 is a chart showing variation of voltage on the grid of a vacuum triode with the spacing of the grid from the cathode.

Fig. 2 is a circuit diagram of a vacuum tube voltmeter embodying the novel features of the present invention.

Fig. 3 is a circuit diagram of a modified form of voltmeter.

Referring to Figure 1, as the cathode is heated, electrons are emitted producing an area near the cathode where the potential in space is negative relative to the cathode. At the anode or plate of the tube a positive voltage is being applied. Thus the field near the anode is positive with respect to the cathode. A plot of the field potential will produce a curve such as OBP. Point B on this curve is the point of inversion where the space voltage is the same as the voltage of the cathode. If the grid is located at this point it will be at the same potential as the cathode. Connecting the cathode to the grid through a resistance, will not result in current flow.

Since it is inconvenient to move the grid back and forth to locate this position, it is best to move the electrical field. This can be achieved by varying the temperature of the cathode, and/or the voltage on the anode, and/or the voltage on the screen grid if a screen grid is present in the tube. For simplicity, let the voltage on the anode (plate) be constant, and let us allow the cathode to cool to a lower temperature. In this case the number of electrons leaving the cathode will be decreased and a curve (dotted) such as OAP will be produced. Increasing the temperature of the cathode, that is increasing the current through the filament, will result in a curve such as OCP. Since points A, B, C, are points of inversion, we have moved the point of potential the same as the cathode, that is the point of inversion to different locations. This in effect is the same as though we had moved the grid. Since temperature of the cathode can be varied continuously we can thus move this point continuously back and forth in space. When the field is adjusted, so that the point of inversion corresponds with the location of the control grid of the tube, the free or floating grid potential is equal to that of the cathode potential. A resistance connecting the cathode and the grid will not change the voltage on the grid since no current will flow between two points having the same potential. Thus we have created a condition of zero grid current. This can be done in a wide variety of tubes and one need not resort to special low grid current electronic tubes.

From the above it is apparent that a wide variation is permitted in circuit design and the particular electronic tube or tubes used, in order to achieve the purpose of this invention. Thus the principle outlined above can be applied to many vacuum tube voltmeter circuits currently in use. Two examples are given in Figures 2 and 3. Figure 2 illustrates an instrument applied to the measurement of minute voltages developed by the glass electrode as used in pH measurements. The novel feature of this design is the means for obtaining the zero grid current position and the measurement of the unknown voltage at this position.

Referring to Figure 2, the numbers 1 through 10, illustrate a means for providing and measuring a voltage necessary to balance the voltage generated at the glass electrode. Wide variation in its design is permitted. 1 is the standard cell; 2 is a switch to close the circuit; 3 is a fixed resistor of 360 ohms in this example; 4 is a variable resistance of maximum value of 200 ohms for a 270° rotation, which is calibrated to adjust for room temperature changes. 5 and 7 are fixed resistors of 500 ohms; 6 is a variable potentiometer so as to center ground the instrument to obtain positive and negative voltages at the output. 8 and 10 are fixed resistors of 500 ohms each; 9 is a 360° helical potentiometer of maximum resistance of 2000 ohms. 9 is calibrated for 59.1 millivolts for one 360° turn which corresponds to 1 pH unit at 25° C. 4, the temperature control, changes the spread for 1 pH unit from 54.5 to 63.5 millivolts or equivalent to a temperature range of from approximately 4–40° centigrade. In the instrument shown in Figure 1 pH from 2–12 is measured since this instrument was specifically designed for the measurement of the pH of body fluids. With a 14 turn helical potentiometer and suitable adjustment of fixed resistances 8 and 10, pH may be measured from 0–14 pH units. 1 is a mercury battery but may be replaced with a Weston or Clark type standard cell. Current drain may be reduced to very small values by increasing resistances, from 1 through 10, of the potentiometer. This is possible because of the use of the potentiometer in a circuit designed to eliminate grid current as described above.

1 may be replaced by two or more batteries in series by adjusting the resistances in the circuit. In this way the instrument is more useful for potentiometric titrations over a wide range for either positive or negative voltages. To double the spread a switch may be inserted from 6 to ground so as to switch the ground to the positive or negative end of the potentiometer. In this case the switching dial indicates the fact that E. M. F. positive, E. M. F. negative, E. M. F. center zero, is being measured. The entire potentiometer may be omitted, calibrating the electrical meter to read directly in voltage, when lesser accuracy is required.

18 is a ceramic switch, single pole, three position, spring return to center. 17 is a bypass condenser, 250 $\mu\mu f.$, used when direct current voltages are being measured. 17 bypasses alternating current picked up due to incomplete shielding. 16 is a fixed resistor chosen so high that the resistance of the system measured is less than 10% of its value. 16 may be omitted and position 15, be left floating. The three positions of switch 18, are position 13, to ground, position 15, which in this case is 1000 megohms above ground, and position 14, which is connected to the unknown voltage to be measured. 2, 23, and 33 are switches which close the potentiometer circuit, the filament circuit and the plate circuit respectively.

19 is a heptode, the 1L6 tube in this case. Filament current in this tube is rated at 50 ma. In actual use the current is of the order of 30 ma. As used in Figure 2, the amplification factor is seven, as measured by a vacuum tube voltmeter inserted in place of the galvanometer. The voltage at the two anodes 30 and 27 is approximately 20 volts in this circuit. 29 is the control grid, 26 refers to the screen grids. 21 and 20 are the leads from the filament or cathode which are the same in this tube. 28 is a grid provided in this tube which is nonessential. It is grounded. 25 is the critical damping resistance of the galvanometer G. The galvanometer is displaced 0.06 $\mu a./mm.$, 1,100 ohms resistance and a critical damping resistance of 4,700 ohms, in this example. 31 is a 20,000 ohm helical potentiometer to adjust the balance between the anodes. 32 is a 20,000 ohm variable resistor, to adjust the voltage to the anodes. 34 is a 30 volt battery; 24 is a 1.345 volt mercury battery. 22 is a fixed resistor of 22 ohms. 22 is chosen to give maximum sensitivity with minimum filament current. A circuit variation is to keep 32 constant and to make 22 variable in adjusting for zero grid current. 11 and 12 represent the electrodes generating the unknown voltage and 11a represents the salt bridge joining the electrodes. To measure pH, 11 and 12 may be two glass, concave electrodes. One of the concave glass electrodes contains the buffer and the other the unknown solution. The bridge consists of a thread of cotton or asbestos saturated with a saturated KCl solution. The dial readings on the potentiometer will move in opposite directions, depending upon which glass electrode is used for the unknown. The advantage of the two glass electrode technique is that the reference buffer is constantly being compared to the unknown and asymmetry potentials of the two glass electrodes tend to cancel out, so that the ground of the potentiometer is closer to true electrical zero, when in operation with glass electrodes. Both electrodes must be shielded when in use, with two glass electrodes.

The measurement of voltage through two glass electrodes is possible in this instrument because the readings obtained are independent of external resistance. In conventional instruments, measurement is made through one glass electrode, with a calomel electrode as the reference electrode.

For conventional use, 11 and 11a are the usual calomel trodes with self contained bridge. 12 is the glass electrode.

Two glass electrodes inserted into veins or arteries can measure pH differences between two locations in the animal or human, without the use of a bridge, the individual being shielded. Measuring membrane potentials due solely to the membrane, where solutions on both sides are identical, is simple with this instrument since KCl junction potentials are absent.

In operation, control grid 29 is always at zero voltage with respect to ground, unless switched to position 14 of switch 18. In this case the potentiometer is adjusted to buck out any voltage from the electrodes and bring the grid again to zero voltage. Thus the tube circuit is merely the null indicator between the potentiometer and electrodes. Reading is always done with control grid at zero potential with respect to ground.

To operate, switch 18 is switched to ground or position 13; and 31 is adjusted so that the galvanometer (G) reads zero. Now 18 is switched to position 15, or 1000 megohms above ground. The galvanometer needle will move either to right or left. The voltage to the plates is changed by 32, until the galvanometer reads zero. This also changes the voltage to the screen grid 26. Switch 18 is now switched back to ground. 31 is adjusted so that the galvanometer reads zero. Switch 18 is returned to position 15 and 32 is again adjusted so the galvanometer reads zero. This is continued until switching from position 13 to 15 produces no deflection on the galvanometer. At this point it makes no difference whether the grid is switched to ground or 1000 megohms above ground, the grid voltage remains zero. This is the zero grid current condition. In actual practice, once the position of 31 is determined it varies little from day to day and only 32 needs slight adjustment due to loss of voltage of the 30 volt battery 34 and due to temperature changes.

To measure the unknown voltage, switch now to position 14, and adjust 9, until galvanometer reads zero. Thus switching to all three positions, 13, 14 and 15, produces no change in the galvanometer. The result is read off the dial measuring the travel of 9. 6 is adjusted, before using the instrument so that with 9 at center no voltage is noted as an output of 9. Thus 6 merely serves to center the potentiometer.

The instrument may be line operated by substituting a tube with a cathode, heated by a filament, and a voltage regulator circuit so as to maintain constant current through the filament and constant voltage to be fed to 32 to the anodes.

Figure 3 shows the zero grid current principle applied to a twin triode circuit. The potentiometer circuit (calibrated, voltage source) is indicated schematically by 35, and the electrodes by 36, since these are essentially the same as in Figure 2. The switch is indicated by 37, with position to ground at 38, 1000 megohms above ground at 39, and position to lead of the voltage source at 40. This switch serves the same purpose as switch 18, in Figure 2. The tube indicated is the 3C6 tube taken as an example, with the two halves represented by 41 and 42. Other twin triodes may be used or two separate triodes will serve the same purpose. 43 and 44 represent the two anodes or plates in this case. 45 is the control grid, connected to switch 37. 46 is the grid connected to the ground. The filaments or cathodes, which are the same in this tube, are represented by the leads 47, 48, and 49. 50 is the filament battery and is a mercury battery of 1.345 volts. 51 is a variable resistor of 30 ohms' maximum resistance. In this circuit it is adjusted so that 54 milliamperes flows through the filament and remains fixed there. It is to be noted that the pair of filaments are connected in parallel. 52 is an optional variable resistance of 50,000 ohms' maximum resistance. Its purpose is to cancel out the positive charge placed on the filament by 50. When used in the manner shown, it serves to decrease the resistance of the helical resistance 53. The maximum resistance of the helical potentiometer at 53 is then chosen as the critical damping resistance of the galvanometer (G) or 5000 ohms. The galvanometer (G) is one similar to the galvanometer in Figure 2. This torsion galvanometer may be replaced by an ammeter or a panel type galvanometer or ammeter, or a mirror type galvanometer or ammeter, of greater sensitivity if desired.

In Figure 3, the voltage supplied to the anodes is generated by a potentiometer circuit. 54 and 55 are fixed resistors of 20,000 ohms; 56 is a helical potentiometer of 10,000 ohms maximum resistance. 57 is a 45 volt battery. The voltage at the anodes (plates) in this circuit is 27 volts. 58 and 59 are switches to close the filament and plate circuits respectively. In operation the zero grid position is attained by setting switch 37 to position 38. 53 is adjusted until the galvanometer reads zero. 37 is now turned to position 39, 1000 megohms above ground, and 56 is adjusted until the galvanometer reads zero. This cycle is repeated until switching from ground to 1000 megohms above ground produces no change on the galvanometer reading. 37 is now switched to position 40. The voltage from 35 is adjusted so that the galvanometer reads zero. Moving of 37 to positions 38, 39, and 40 should produce no change in the reading of the galvanometer. The unknown voltage of the electrodes is read off the calibrated scale of 35. This instrument may also be line operated as outline for the instrument of Figure 2.

In Figure 3 the twin triode may be replaced by a single triode in which case, the triode with the grid grounded, 42 is replaced by a battery which serves to balance the triode 41, whose grid is connected to switch 37. The circuit then simplifies to a measured source of voltage (35), the unknown source of voltage (36), the switch 37, with positions to ground, high resistance above ground, and unknown voltage and a triode vacuum voltmeter circuit with controls for regulating the field in the triode.

In Figure 3, 51 or 52 may be used to adjust the field instead of 56. In this case the same procedure for operation of the instrument is used except that adjustments are now made on 53 and 52 or 51 while 56 is kept constant.

Since the tube serves merely to indicate when the potentiometer has balanced the unknown voltage to be measured, and since at balance no grid current is flowing, resistances of the source and the potentiometer do not affect the reading. If leakage to ground either from inside or outside the tube occurs, it serves as a shunt to lessen the sensitivity of the instrument but does not affect the null point. Only when external resistances are of the order of the resistance of the ceramic switch (37 in Figure 3) to ground is serious sensitivity loss noted. A wide variety of vacuum tubes have been used with this principle.

The baseline of voltage measurement in this circuit is ground, thus minute voltages may be measured with great accuracy. For example, if in a conventional circuit the grid bias is −200 millivolts, a change of 0.02 millivolt is a 0.01% change. This change can be brought about by relatively slight changes in filament current or screen grid or plate voltages. In the circuit of this invention, a change from a baseline of zero to 0.02 millivolt is a relatively large change and is readily detected.

The simplicity of the circuit lends itself to the manufacture of small portable instruments with a minmium of parts. Using a heater type tube such as the 6J6 a line instrument, 110 volts, 60 cycle, may be readily constructed.

The instrument of Figure 3 will measure minute A. C. voltages, when the galvanometer is replaced by an A. C. meter.

I claim:
1. In a pH meter, designed to measure small pH values with precision, said pH meter being of the type having a multi-grid vacuum tube, having a cathode circuit and adjustable means of heating the cathode; anode and screen grid circuits, having adjustable means for applying positive potential to the anode and screen grid, and wherein the pH is measured by a difference in potential between electrodes placed in a substance whose unknown pH value is being measured by impressing the potential difference of said electrodes upon the control grid of the vacuum tube; and wherein, when the cathode of said vacuum tube is heated, a negative space charge, relative to the cathode, is created in the area surrounding the cathode, the electrons in said area being drawn to the anode, by applying positive potential to the screen grid and the anode, the control grid acting as a valve, the electrons from the cathode flowing outward from the cathode or back to the cathode because of a difference in charged space potential between the physical area surrounding the control grid, and the physical area surrounding the cathode, thus inducing an undesired grid current in said control grid, inducing errors in measuring the unknown pH; the improved means for exactly determining the unknown pH without error due to grid current by eliminating said grid current by adjusting the potentials applied to the vacuum tube to shift the electrical field therein so that the charged space around the physical area of the control grid is at the same potential as the charged space in the physical area around the cathode, said improved means comprising, a grid arm circuit to the ground, a grid leg circuit to the ground through a high resistance, and a grid measuring circuit between the grid and the ground, through the measuring electrodes, the substance whose pH is being measured and adjustable electrical components; and in combination therewithall, of grid switch means to sequentially connect the control grid separately to the grid arm, grid leg, and grid measuring circuits; a galvanometer to indicate zero grid potential with respect to the cathode when adjustments are made to the adjustable means in the cathode, screen grid, and anode circuits when the control grid is shifted to the grid arm, grid leg, and grid measuring circuits, thereby permitting switching the control grid to the grid measuring circuit at zero grid current, so that the only current registering on the galvanometer is the current caused by the unknown pH being measured; separately readable calibrations in the adjustable electrical components of the grid measuring circuit corresponding to units of pH value, said components being adapted and designed to be inserted into said grid measuring circuit to give a potential in a direction opposite and balancing out the potential caused by the pH being measured, the total pH being readable when the current in the galvanometer caused by the pH being measured has been balanced out and the galvanometer in the anode circuit again reads zero.

2. In an instrument designed to measure the components creating small quantities of electrical energy with precision, said instrument being of the type having a multi-grid vacuum tube, vacuum tube circuits, including a cathode circuit having adjustable means of activating the cathode, anode and screen grid circuits having adjustable means of applying a positive potential to the anode and screen grid; wherein the unknown electrical factor to be measured is impressed upon the control grid of the vacuum tube, said vacuum tube being of the type wherein the tube cathode when activated, creates a negative space charge surrounding the cathode relative to the cathode, the electrons in said space being drawn to the anode by applying positive potential to the anode, the control grid acting as a valve in that a potential applied to said control grid draws or repels the electrons from the space surrounding the cathode, and wherein said electrons from the cathode flow outward towards the control grid or back to the cathode due to a difference in potential between the physical area surrounding the control grid and the physical area surrounding the cathode, thus inducing in undesired grid current in said control grid, inducing errors in measuring the unknown factor to be measured, means of accurately measuring the unknown factor and eliminating the grid current by adjusting the potentials applied to the vacuum tube to shift the electrical field therein so that the charged space around the physical area of the grid is as at same potential as the charged space in the physical area around the cathode, said means comprising, a grid arm circuit to the ground, a grid leg circuit to the ground through a high resistance, and a grid measuring circuit, between the grid and the ground through the unknown electrical factor to be measured and adjustable electrical components; and in combination therewithall, of grid switch means to sequentially connect the grid separately to the grid arm, grid leg, and grid measuring circuits, a measuring device adapted and designed to indicate zero grid potential with respect to the cathode when the grid switch is shifted to the grid arm, grid leg, grid measuring circuits, and when adjustments are made to the adjustable means in the cathode, anode, and screen grid circuits, thereby permitting switching to the grid measuring circuit when there is no grid current, so that the only current registering on the device will be that caused by the unknown factor being measured; readable calibrations on the adjustable electrical components of the grid measuring circuit corresponding to desired units, means of inserting said calibrated components in said grid measuring circuit so as to balance out the electrical energy caused by the unknown factor, the quantity of said unknown factor then being known in desired units when said factor is balanced out and the measuring device of the anode circuit again indicates no current in said circuit.

3. In an instrument designed to measure the components creating small quantities of electrical energy with precision, wherein the unknown electrical factor to be measured is impressed upon the control grid of a vacuum tube having vacuum tube circuits, including a cathode circuit having adjustable means of activating the cathode, and an anode circuit having an adjustable source of voltage for applying a positive potential to the anode; and, said vacuum tube being of the type wherein the tube cathode is activated, creating a negative space charge surrounding the cathode relative to the cathode, the electrons in said space being drawn to the tube anode by applying a positive potential to the anode, and having a control grid acting as a valve, wherein a potential applied to said control grid draws or repels the electrons from the space surrounding the cathode, and wherein said electrons from the cathode flow outward towards said grid or back to the cathode due to a difference in potential between the physical area surrounding the grid and the physical area surrounding the cathode when no potential is applied to the anode, thus inducing an undesired grid current in said grid, inducing errors in measuring the unknown electrical factor to be measured, means of eliminating the undesired grid current by adjusting the potential applied to the vacuum tube to shift the electrical field therein so that the charged space around the physical area of the grid is at the same potential as the charged space in the physical area around the cathode, said means comprising, a grid arm circuit to the ground, a grid leg circuit to the ground through a high resistance, and a grid measuring circuit, between the grid and ground through the unknown electrical factor to be measured, and through calibrated electrical components adapted and designed to balance out said unknown electrical factor; and, in combination therewithall of grid switch means to sequentially connect the grid separately to the grid arm, grid leg, and grid measuring circuits, a measuring device adapted and designed to indicate the quantity of one of the components of electrical energy flowing at the anode, when the grid is shifted to the grid arm circuit, the grid leg circuit, when the cathode is activated, when potential is applied to the anode, and likewise, means in said device to indicate zero potential with respect to the cathode when switching to the respective grid circuits after proper adjustments have been made to the adjustable means in the cathode and anode circuits, thereby permitting the switching of the grid to the grid measuring circuit at zero potential with respect to the cathode.

4. A device as claimed in claim 3, said vacuum tube circuits being housed in a twin triode circuit, the unknown electrical factor to be measured being impressed upon the control grid of one of the twin triodes, the grid of the other triode being connected to the ground.

5. A pH meter adapted and designed to measure the pH of an unknown substance by impressing the potential difference between electrodes immersed in said substance on the control grid of a multi-grid vacuum tube, said vacuum tube having cathode, anode and screen grid circuits, and adjustable means in said circuits for applying a positive potential to the anode and screen grid and for heating the cathode, and a galvanometer, adapted and designed to indicate zero grid potential with respect to the cathode, characterized in that there is provided a grid arm circuit to the ground, a grid leg circuit to the ground through high resistance, a grid measuring circuit to the ground through the unknown substance whose pH is being measured, grid switch means to sequentially switch the control grid to said grid arm, grid leg, and grid measuring circuits, thereby permitting the switching to the grid measuring circuit after proper adjustments made to the adjustable means in the cathode, anode and screen grid circuits to bring the cathode and control grid to the same potential, as indicated by a zero reading on the galvanometer, when the control grid is connected to the grid arm and grid leg circuits so that the only current flowing through the galvanometer when the switch is connected to the grid measuring circuit is that caused by the pH being measured, and in combination therewith, adjustable electrical components calibrated as pH units, means to insert said components into the grid measuring circuit, means to create a potential through said components in a direction opposite to that caused by the measured pH, means of reading the total units of said calibrated components when the current in the anode circuit caused by said pH is balanced out and the galvanometer reads zero.

6. An apparatus for measuring small quantities of the components of electrical energy in an unknown factor, by impressing the electrical energy created by said factor on the control grid of a multi-grid tube, said tube having a cathode, anode and screen grid circuits, and adjustable means of heating the cathode and for applying positive potential to the anode and screen grid in said circuits, and a galvanometer in the anode circuit adapted and designed to indicate zero grid potential with respect to the cathode characterized in that there is provided a grid arm circuit to the ground, a grid leg circuit to the ground through high resistances, a grid measuring circuit to the ground through the unknown factor being measured and grid switch means adapted and designed to sequentially switch the control grid to said grid arm, grid leg, and grid measuring circuits, thereby permitting the switching to the grid measuring circuit with the cathode and control grid at the same potential as indicated by a zero reading on the galvanometer, after proper adjustments to the adjustable means in the cathode, anode, and screen grid circuits, so that the only current flowing through the galvanometer when switched to the grid measuring circuit is that caused by the electrical energy factor being measured, and in combination therewith, adjustable electrical components, calibrated in desired units, means to insert said components in the grid measuring circuit, means to create a flow of current through said components in a direction opposite to the flow of the components of energy being measured, and means for reading the total units needed to completely balance out said components of electrical energy being measured.

7. A pH meter comprising in combination, a multi-grid vacuum tube, cathode, anode and screen grid circuits in said tube, adjustable means in said circuits for applying positive voltage to the anode and screen grid and for heating the cathode, a control grid in said tube, a grid arm circuit to ground, a grid leg circuit to ground through high resistance, and a grid measuring circuit to ground through the substance whose pH is being measured, electrodes in said grid measuring circuit adapted and designed to be placed in said substance, grid switch means adapted and designed to switch the grid arm, grid leg, and grid measuring circuits sequentially to the control grid, adjustable components adapted and designed for insertion in the grid measuring circuit, said components being calibrated in pH units and designed to balance out the current flow caused by the pH being measured, means for totalling and reading said calibrations, a galvanometer indicating zero grid potential with respect to the cathode to enable switching the control grid to the grid measuring circuit while the control grid and cathode are at the same potential after the control grid has first been switched to and from the grid arm and grid leg circuits and proper adjustments have been made to the adjustable means in the cathode, anode, and screen grid circuits, said galvanometer, when the control grid is switched to the grid measuring circuit indicating the current at the anode caused by the pH being measured, and indicating no current after the current caused by said pH has been balanced out by the insertion of the number of calibrated components in the grid measuring circuit corresponding to the unknown pH.

8. An instrument designed to measure small quantities of electrical energy components, comprising in combination a multi-grid vacuum tube, cathode, anode, and screen grid circuits in said tube, adjustable means in said circuits for applying positive voltage to the anode and screen grid and for heating the cathode, a control grid in said tube, a grid arm circuit to ground, a grid leg circuit to ground through high resistances and a grid measuring circuit to ground through the electrical energy being measured, grid switch means adapted and designed to switch the grid arm, grid leg, and grid measuring circuits sequentially to the control grid, adjustable components adapted and designed for insertion in the grid measuring circuit, calibrated in desired units and designed to balance out the current flow caused by the electrical energy being measured, means for reading and totalling said calibrations, a galvanometer indicating zero grid potential with respect to the cathode to enable switching the control grid to the grid measuring circuit when the control grid and the cathode are at the same potential after the control grid is switched to and from the grid arm and grid leg circuits and proper adjustments have been made to the adjustable means in the cathode, anode and screen grid circuits, so that the only current registering on the galvanometer when the control grid is switched to the grid measuring circuit is that caused by the energy being measured and indicating no current after the current caused by said energy has been balanced out by the quantity of calibrated units which will indicate the total of the components of electrical energy being measured.

References Cited in the file of this patent

UNITED STATES PATENTS

| | | |
|---|---|---|
| 2,267,820 | Droz et al. | Dec. 30, 1941 |
| 2,285,482 | Wunsch | June 9, 1942 |
| 2,449,068 | Gunn | Sept. 14, 1948 |
| 2,516,520 | Lamport et al. | July 25, 1950 |
| 2,676,300 | Hirsch et al. | Apr. 20, 1954 |

FOREIGN PATENTS

| | | |
|---|---|---|
| 233,601 | Switzerland | Nov. 1, 1944 |